Oct. 21, 1941.  J. N. MILLER  2,260,106
FLY SWATTER
Filed Jan. 8, 1941
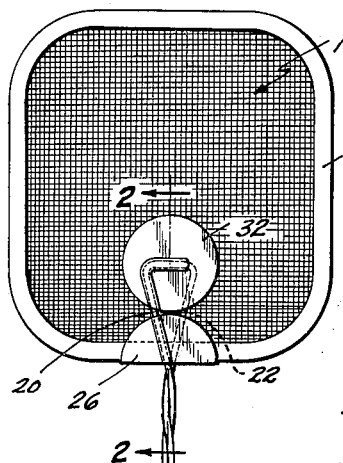
Fig. 1.
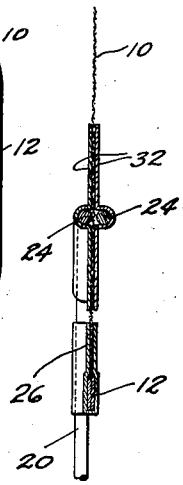
Fig. 2.
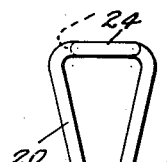
Fig. 3.
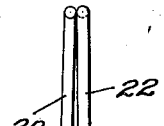
Fig. 4.
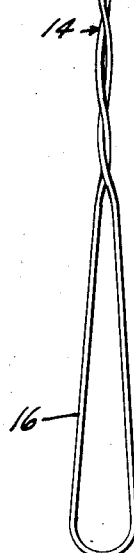
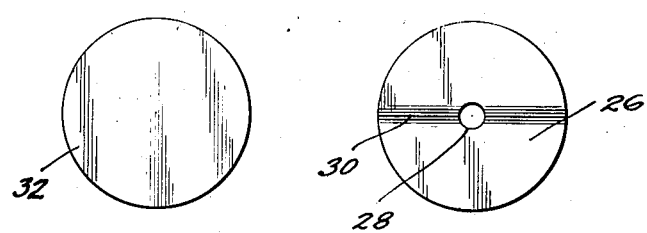
Fig. 5.   Fig. 6.
INVENTOR.
JOSEPH N. MILLER
BY Harry H. Hitzeman
HIS ATTORNEY.

Patented Oct. 21, 1941

2,260,106

UNITED STATES PATENT OFFICE 2,260,106

FLY SWATTER

Joseph N. Miller, McHenry, Ill.

Application January 8, 1941, Serial No. 373,635

3 Claims. (Cl. 43—137)

My invention relates to improvements in fly swatters and similar devices.

My invention relates more particularly to improvements in both the methods of manufacture and the finished fly swatter of a type which is constructed of screen and provided with a metal or wire handle.

The principal object of the present invention is to provide an improved fly swatter or insect beater provided with a mesh screen blade, a wire handle and an improved method of fastening the same together.

A further object of the invention is to provide a fly swatter of the type described wherein the screen blade and the wire handle are securely fastened together by an adhesive tape or patch similar to the type used for fixing punctures in automobile tire inner tubes.

A further object of my invention is to provide a construction of fly swatter of the type described by which the blade and handle are easily and quickly assembled together and when assembled are capable of long and hard usage without becoming broken or out of order.

A further object of the invention is to provide a fly swatter or insect beater of the type described that is easily and cheaply manufactured and constructed of parts which are not capable of becoming easily broken during use.

Other objects and advantages will be more apparent from the following description wherein reference is had to the accompanying sheet of drawings, upon which Fig. 1 is a front elevational view of my improved fly swatter;

Fig. 2 is an enlarged sectional view taken on the lines 2—2 of Fig. 1, showing the manner in which the wire handle is attached to the screen blade;

Fig. 3 is a fragmentary front view of the upper end of the handle member;

Fig. 4 is a side view of the same showing the manner in which spring tension is put into the ends of the wire;

Fig. 5 is a front elevational view of one of the adhesive patches used for sealing the ends of the handle wire to the screen blade, and Fig. 6 is a front elevational view of the edge patch which fastens the portions of the wire handle to the edge of the screen blade.

In the embodiment of my invention which I have chosen to illustrate, I have shown a beater blade 10 which may be constructed of a fine wire mesh provided with a tape edge binder 12 about its entire periphery. This construction and the manner in which the tape is applied to the screen blade may be generally similar to that shown and described in my United States Patent No. 1,487,750, issued to me on March 25, 1924.

The handle 14 which may be made of a continuous piece of wire, may be formed at the lower end with the enlarged loop 16, and then provided with the plurality of twists 18 to a point adjacent the screen blade 10 at which point one leg 20 of the wire may be bent outwardly from the plane of the handle in one direction, and the other leg 22 may be bent outwardly in an opposite direction. Each of the legs 20 and 22 has its end 24 bent generally at right angles, the two ends 24 in front elevation (Fig. 3) being disposed one in front of the other. It will be noted from an examination of Fig. 4 that while the ends 24 are touching, the ends of the legs 20 and 22 are separated by a considerable space W. In forming the handle from the continuous length of wire, the ends of the legs 20 and 22 are separated thus to provide a spring tension to the legs 20 and 22.

The handle 14 may now be applied to the blade 10 by having the legs 20 and 22 pushed over one edge 12 of the blade 10. In forming the handle 14, and prior to the time that the legs 20 and 22 are separated as shown, I place the adhesive patch 26 over the wires of the handle. The adhesive patch 26 may be generally cylindrical in shape or any other shape if desired, and may be formed with a central opening 28 for the purpose of being passed over the wires. This patch may be generally of the type used for making tire repairs, and when the handle is applied to the blade as described, it may be bent along a medial line 30 and fastened over the legs 20 and 22, the edge 12 of the blade, and over a portion of the blade 10. In this way the handle is effectively secured to the blade.

In order to protect the extensions of the legs 20 and 22 and their ends 24, and to more firmly secure the handle to the blade, I have provided the adhesive patches 32 which may now be applied upon opposite sides of the blade 10 and thus firmly cover the extended edges of the handle wires as well as securely adhere the ends of the handle wire to the blade.

From the above and foregoing description it will be apparent to those skilled in the art that I have provided a highly improved manner of making a fly swatter or similar device, as well as a highly improved and very serviceable article. When the handle and blade have been assembled together as herein described, it will be apparent that there is no possibility of the parts becoming loosened. Throughout the life of the fly swatter the handle and blade are integrally secured together in a simple yet very effective manner.

While I have illustrated and described a specific embodiment of my invention, it will be apparent to those skilled in the art that changes and modifications may be made in the exact details shown, and I do not wish to be limited in any particular; rather, what I desire to secure and protect by Letters Patent of the United States is:

1. In an insect beater, the combination of a generally rectangularly shaped blade, a handle therefor constructed of a continuous piece of wire having its connected end formed with a pair of diverging leg portions adapted to extend upon opposite sides of the blade, said legs having parallel and overlying end portions, and an adhesive patch on each side of the blade and overlying said end portions for connecting the legs of the handle to the blade.

2. In an insect beater, the combination of a generally rectangularly shaped blade, a handle therefor constructed of a continuous piece of wire having its connected end formed with a pair of diverging leg portions adapted to extend upon opposite sides of the blade, said legs having parallel and overlying end portions and an adhesive patch on each side of the blade and overlying said end portions for connecting the legs of the handle to the blade, and a similar patch with an opening therethrough over the handle and edge of the blade.

3. In an insect beater, the combination of a generally rectangularly shaped blade, a handle therefor constructed of a continuous piece of wire formed with a loop at one end and a twisted portion, having its connected end formed with a pair of diverging leg portions having parallel and overlying ends adapted to extend upon opposite sides of the blade and resiliently hold said blade therebetween, and adhesive patches for connecting the legs of the handle to the blade, said patches fastened on opposite sides of the blade over said legs.

JOSEPH N. MILLER.